United States Patent

[11] 3,608,951

| [72] | Inventor | Samuel Thomas Jackson<br>819 Stokes St., Danville, Va. 24541 |
|---|---|---|
| [21] | Appl. No. | 8,522 |
| [22] | Filed | Feb. 4, 1970 |
| [45] | Patented | Sept. 28, 1971 |

[54] TRAILER PORCH
6 Claims, 4 Drawing Figs.

[52] U.S. Cl. .................................................. 296/23,
52/64
[51] Int. Cl. ...................................................... B60p 3/34
[50] Field of Search ............................................ 296/23;
52/64

[56] References Cited
UNITED STATES PATENTS
3,288,516  11/1966  Lewis .......................... 296/23

3,515,406  6/1970  Endsley ........................ 296/23 X
*Primary Examiner*—Philip Goodman
*Attorney*—Edmund M. Jaskiewicz ABSTRACT: A readily assembled porch includes a rear unit positioned against a mobile home or the like and comprising a pair of vertical columns permanently connected by upper and lower crossmembers. A front unit is spaced outwardly from the rare unit and similarly comprises vertical columns permanently interconnected by crossmembers and the ends of the rear and front units being detachably connected by side rail members and upper and lower crossmembers. A panel member extends between the rear and front units and lower cross members to define a floor and a roof is formed by a panel extending across the upper ends of the rear and front units.

PATENTED SEP 28 1971

INVENTOR
SAMUEL T. JACKSON

BY Edmund M. Jaskiewicz
ATTORNEY

INVENTOR
SAMUEL T. JACKSON

TRAILER PORCH

The present invention relates to a porch structure for dwellings, more particularly, to a readily assembled porch for use with mobile homes, trailers and the like.

Mobile homes and trailers which may be hauled to a desired location by motor vehicles are being used by many persons as dwellings for extended periods of time. It is frequently desired to make various improvements to such dwellings in order to attain some of the comforts and atmosphere of a more permanent type dwelling. In order to provide an outdoor surface adjacent the dwelling upon which the occupants may sit in their leisure moments patio-type structures have been constructed on the ground. Such structures are generally of a permanent nature since they are constructed of concrete and mortar and remain in place should the owner of a trailer decide to move to a new location.

Some persons have attached roofs to their dwellings in an attempt to provide shelter from the sun and rain. Such a roof when combined with a patio provides a rudimentary type of a porch. Where the occupant of such a home prefers a porch he must construct a custom-built structure which may take considerable time to assemble and also considerable time to dismantle in the event he wishes to take the structure with him should he move to a new location. While many occupants have desired the advantages of such a porch they have been reluctant to construct such porches in view of the difficulties and expense involved.

It is therefore the principal object of the present invention to provide a novel and improved readily assembled porch particularly adapted for mobile homes, trailers and the like.

It is another object of the present invention to provide a trailer porch consisting of several prefabricated units which can be readily assembled and disassembled with a minimum of tools and labor.

It is a further object of the present invention to provide a readily assembled trailer porch which is sufficiently rugged to withstand long and hard use and at the same time enhances the appearance of the dwelling with which it is being used.

According to one aspect of the present invention a readily assembled porch particularly adapted for mobile homes and trailers may comprise a rear unit positioned against the enclosure with which is is being used and a front unit spaced outwardly from the rear unit. A pair of side rail units detachably connects the ends of the rear and front units and crossmembers detachably interconnect the upper ends and lower portions of the rear and front units. A panel member extends between the lower crossmembers and the rear and front units to define a floor. A second panel member is detachably connected to the upper end crossmembers and extends between the rear and front units to define a roof.

The rear and front units each comprise a pair of vertical columns permanently interconnected by upper and lower longitudinal members. In addition, the front unit comprises railing members extending inwardly from the vertical columns and terminating short of each other to define an opening. These units may be readily connected by bolts so that the entire porch may be quickly assembled in position.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment of the present invention will be described in detail.

Figure 1:
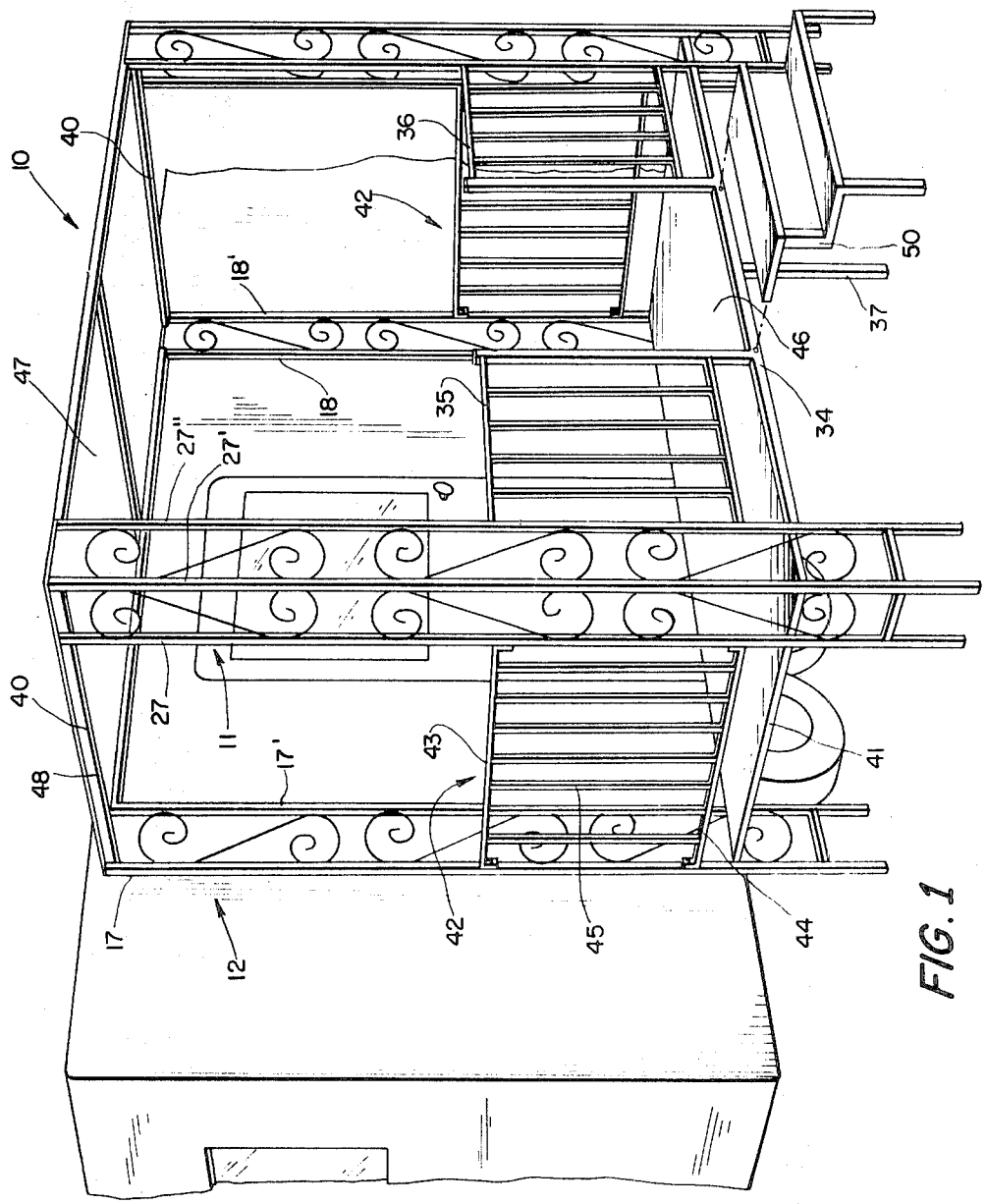
FIG. 1 is an overall perspective view of a trailer porch according to the present invention.
Figure 4:
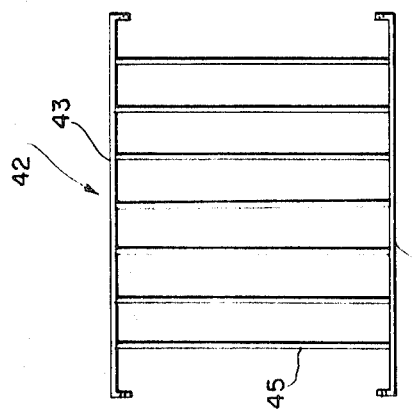
FIG. 4 is an elevational view of a side rail unit which interconnects both ends of the front and rear units.
Figure 2:
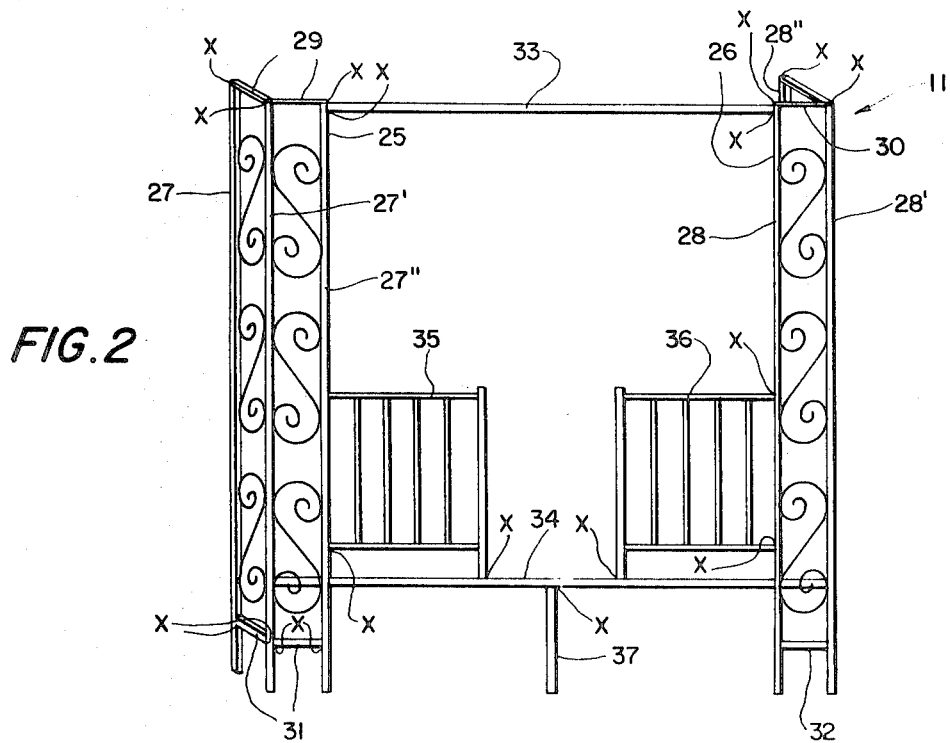
FIG. 2 is a perspective view of the front unit of the porch of FIG. 1.
Figure 3:
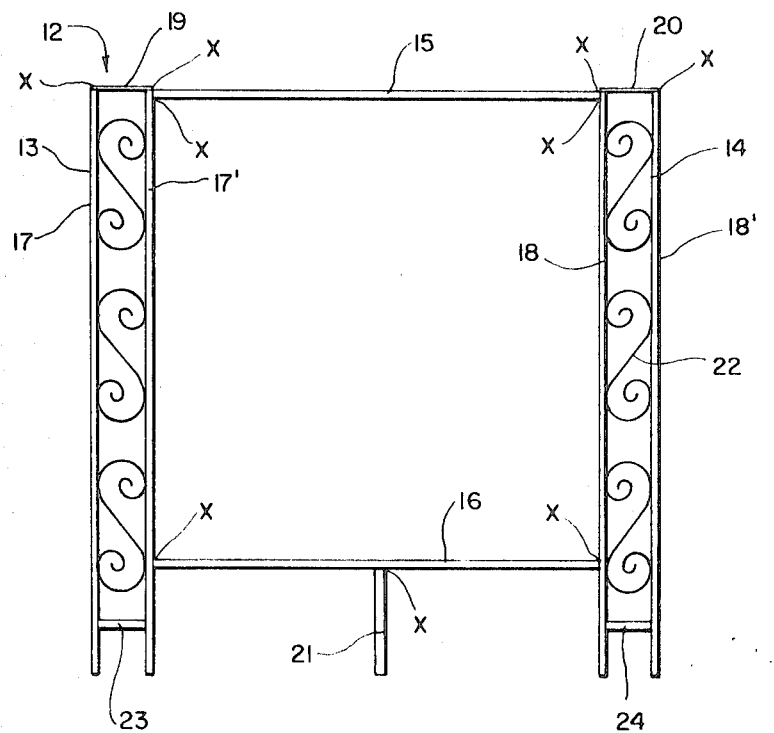
FIG. 3 is a front elevational view of the rear unit of the porch of FIG. 1.

A trailer porch according to the present invention is indicated generally at 10 in FIG. 1 and comprises a front unit 11, shown in FIG. 2, and a rear unit 12 shown in FIG. 3.

The rear unit 12 which is positioned against the trailer or other enclosure with which the porch is to be used comprises a pair of vertical columns 13 and 14 interconnected at their upper ends by a longitudinal cross member 15 and at their lower portions by a longitudinal cross member 16. The cross members 15 and 16 are permanently connected to the columns by welding at the junctions marked with an X. Each column 13 and 14 consists of a pair of upright rods 17,17' and 18,18' respectively. The tops of these columns are interconnected by relatively flat members 19 and 20 which are welded to the upper ends at X.

In the center of the lower cross member 16 there is welded a supporting leg 21. The distance of the cross member 16 above the bottom ends of the vertical columns determines the height of the porch floor when the porch is assembled. Curved members such as 22 may be welded between the upright rods of the vertical columns to provide additional strength to the vertical columns and to enhance their appearance. Cross braces 23 may also be welded between the lower ends of the uprights of each vertical column.

The structure as described above and illustrated in FIG. 3 thus constitutes a single unitary structural unit which is prefabricated.

In a similar manner, the front unit 11 comprises a pair of vertical columns 25 and 26 with each column being formed of three vertical upright members 27,27',27" and 28,28',28". The upper ends of the uprights of column 25 are connected by flat straps 29 welded to the upper ends and, similarly, the uprights of column 26 are connected by flat straps 30 welded to their upper ends. The lower portions of column 25 are interconnected by braces 31 which are welded to the respective uprights and in column 26 braces 32 are similarly welded between the uprights.

The upper ends of columns 25 and 26 are interconnected by a longitudinal crossmember 33 welded at its ends to uprights 27" and 28. A similar longitudinal crossmember 34 is welded to uprights 27' and 27" and 28 and 28" at the X's.

The front unit 11 further comprises left and right rail members 35 and 36 each of which includes upper and lower parallel members interconnected by a plurality of uprights welded thereto. Each railing is welded at X to be secured to the vertical columns and lower cross member 34. A supporting leg 37 is welded to the central portion of the cross member 34.

In a similar manner the vertical columns may be strengthened and enhanced in appearance by welding a plurality of curved members 38 between the uprights. While not shown in the drawings such curved decorative members may also be welded between the uprights of the rail members to enhance their appearance.

Thus, a front unit 11 as described above and illustrated in FIG. 2 also constitutes a single structural unit which is prefabricated.

In order to assemble the porch, the front unit 11 is detachably connected to the rear unit 12 by means of upper and lower crossmembers 40 and 41 and side rail members 42. The crossmember 40 is bolted to the upper end of upright 17 and to the upper ends of uprights 27 and 27' and lower crossmember 41 is bolted to upright 17 and to uprights 27 and 27'. The crossmembers 40 and 41 are similarly bolted to the corresponding uprights on the other end of the porch.

The side rail member 42 comprises upper and lower rails 43 and 44 with the ends of the upper rail 43 being bent downwardly and having apertures therethrough to receive bolts for attaching the rail unit to the uprights 17 and 27. In a similar manner, the lower rail 44 has its ends bent upwardly and is provided with apertures to accommodate bolts for similar attachment to uprights 17 and 27. A plurality of vertical beams 45 are welded between the upper and lower rails 43 and 44 to form a unitary side rail unit.

The floor of the porch is formed by a panel member 46 which may be 1-inch plywood treated for weather resistance and covered on its upper face with an indoor-outdoor carpet. The panel rests upon the crossmembers 41 and on any intermediate crossmembers which may be bolted between the front and rear units.

The roof of the porch is indicated at 47 and may be similarly formed by plywood or a sheet of aluminum which is bolted to the crossmembers 40 at 48. Instead of a panel, the roof may also be raised so as to be sloping or have an A-section.

Stairs 50 may be prefabricated and detachably connected to the longitudinal crossmember 34 as indicated in FIG. 1.

In order to stabilize the porch structure the rear unit 12 may be suitably attached to the enclosure or mobile home by bolts, screws or other suitable detachable fasteners. The lower ends of the uprights of the vertical columns of the front and rear units may be provided with mounting plates when the porch is to be erected upon the ground. These plates will prevent sinking of the uprights into the ground. Where the porch is to be erected upon a concrete base, the lower ends of the vertical columns may be detachably connected to the concrete in a suitable manner as known in the art.

While the steps 50 have been disclosed as being attached to the front unit they may also be attached to either end of the porch or offcenter with respect to the front unit. When the steps are mounted at the ends of the porch a side rail unit 42 may be omitted and a modified rail unit provided for the front unit.

Thus it can be seen that the trailer porch according to the present invention may be readily assembled and disassembled by merely bolting and unbolting the components together. The components comprise front, rear and side rail units all of which are prefabricated and may be readily connected together on the site with a minimum of labor and tools. The resulting porch structure is not only rugged and durable but is also decorative so as to enhance the appearance of the dwelling to which it is attached.

While the subject trailer porch has been described as being constructed of metallic elements which are welded together to form the several units, the porch can also be constructed of plastic, wood or other materials permanently attached together to form the structural units as described above. In addition, the assembled trailer porch according to this invention may be provided with wheels which may be removable so as to impart a degree of mobility to the porch. By equipping such a trailer porch with wheels, the porch could be assembled at one location and readily moved to the site at which it is to be used.

It is understood that this invention is susceptible to modification in order to adapt it to different usages and conditions and, accordingly, it is desired to comprehend such modifications within the invention as may fall within the scope of the appended claims.

What is claimed is:

1. A readily assembled porch particularly adapted for mobile homes and trailers and comprising a rear unit positioned against an enclosure with which it is to be used, a front unit spaced outwardly from said rear unit, means detachably interconnecting the ends of said rear and front units at the upper, central and lower portions thereof, a panel member extending between said lower interconnecting means and said rear and front units to define a floor, and second panel means detachably connected to the upper interconnecting means and extending between the rear and front units to define a roof, said interconnecting means comprises a pair of said rail units detachably connected between the ends of said front and rear units, and crossmembers detachably interconnecting the upper and lower portions of said rear and front units.

2. A readily assembled porch as claimed in claim 1 wherein said side rail units each comprises upper and lower members permanently interconnected by a plurality of vertical members to define a unitary structural unit.

3. A readily assembled porch as claimed in claim 1 wherein said rear and front units each comprises spaced vertical columns permanently interconnected by upper and lower longitudinal crossmembers to define a unitary structural unit.

4. A readily assembled porch as claimed in claim 3 wherein said front unit comprises railing means extending inwardly from each of the vertical columns thereof and terminating short of each other to define an opening.

5. A readily assembled porch as claimed in claim 3 wherein said front unit vertical columns each has an angle cross section.

6. A readily assembled porch as claimed in claim 4 and further comprising steps detachably mounted to said front unit at said opening between the railing means.